United States Patent
Sugimura

(10) Patent No.: US 6,743,103 B2
(45) Date of Patent: Jun. 1, 2004

(54) MEMORY CARD DEVICE, VIDEO GAME APPARATUS, AND PROGRAM PROVIDING MEDIUM

(75) Inventor: Akihiro Sugimura, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 28 days.

(21) Appl. No.: 09/976,372

(22) Filed: Oct. 12, 2001

(65) Prior Publication Data

US 2002/0032059 A1 Mar. 14, 2002

Related U.S. Application Data

(62) Division of application No. 09/202,795, filed as application No. PCT/JP98/01917 on Apr. 24, 1998, now Pat. No. 6,582,311.

(30) Foreign Application Priority Data

Apr. 24, 1997 (JP) .............................................. 9-107943

(51) Int. Cl.[7] .............................................. G06F 17/00
(52) U.S. Cl. ........................................... 463/43; 463/47
(58) Field of Search ............................. 463/1, 9–11, 30, 463/37–44, 45, 47; 725/145, 147

(56) References Cited

U.S. PATENT DOCUMENTS

| | | | |
|---|---|---|---|
| 5,184,830 A | | 2/1993 | Okada et al. ................ 273/433 |
| 5,428,528 A | | 6/1995 | Takenouchi et al. ......... 364/410 |
| 5,600,800 A | * | 2/1997 | Kikinis et al. ............... 710/303 |
| 5,668,591 A | * | 9/1997 | Shintani ....................... 725/140 |
| 5,759,100 A | | 6/1998 | Nakanishi ...................... 463/37 |
| 5,785,598 A | | 7/1998 | Hsu ............................... 463/44 |
| 5,791,994 A | | 8/1998 | Hirano et al. .................. 463/43 |
| 5,797,085 A | | 8/1998 | Beuk et al. .................... 455/88 |
| 6,007,428 A | | 12/1999 | Nishiumi et al. .............. 463/36 |

FOREIGN PATENT DOCUMENTS

| | | | | |
|---|---|---|---|---|
| EP | 0685 246 A1 | | 12/1995 | |
| JP | 62-255192 | | 11/1987 | |
| JP | 3-120918 | | 5/1991 | |
| JP | 3-278994 | | 12/1991 | |
| JP | 4-26432 | | 1/1992 | |
| JP | 6-259615 | | 9/1994 | |
| JP | 06-259615 | * | 9/1994 | ........... G06K/19/07 |
| JP | 8-30841 | | 2/1996 | |
| JP | 8-161438 | | 6/1996 | |
| WO | WO 93/23125 | | 11/1993 | |

\* cited by examiner

*Primary Examiner*—Kim Nguyen
(74) *Attorney, Agent, or Firm*—Lerner, David, Littenberg, Krumholz & Mentlik LLP

(57) ABSTRACT

As disclosed herein, a video game apparatus has a base unit and an auxiliary memory unit connectable thereto. The base unit executes an application program to provide a video game and downloads a first application program and attribute data for executing the first application program to the auxiliary memory unit. The auxiliary memory unit executes the first application program downloaded from the base unit to provide a video game independently of the base unit. The auxiliary memory can also change attribute data, and the changed attribute data can then be received therefrom by the base unit and used to execute a second application program for providing a video game at the base unit.

15 Claims, 15 Drawing Sheets

MEMORY CARD DEVICE, VIDEO GAME APPARATUS, AND PROGRAM PROVIDING MEDIUM

CROSS REFERENCE TO RELATED APPLICATIONS

This application is a divisional of application Ser. No. 09/202,795 filed Mar. 3, 1999, which is the National Stage of International Application No. PCT JP98/01917, filed Apr. 24, 1998. The disclosure of said U.S. application is hereby incorporated by reference herein.

BACKGROUND OF THE INVENTION

This invention relates to a memory card device used as an auxiliary memory unit of information equipment, a video game apparatus having a function to store game data, etc. into an auxiliary memory unit, and a program providing medium.

A conventional memory card used in the state inserted into information equipment, etc. is caused to be of a configuration comprising an interface for connecting to the body of the information equipment and a non-volatile memory element for storing data.

FIG. 1A shows an example of the configuration of the main part of such a conventional memory card. This conventional memory card 80 comprises a control unit 81 for controlling its operation, a connector 82 for connecting to a terminal provided within a slot in the information equipment, etc., and a non-volatile memory 86 for storing data, wherein the connector 82 and the non-volatile memory 86 are connected to the control unit 81.

The control unit 81 is constituted by using, e.g., a microcomputer. Moreover, as non-volatile memory 86, a flash memory, e.g., an EEPROM (Electrically Erasable Programmable Read Only Memory), etc. is used. Moreover, there are also instances where, for a connection interface to the information equipment, etc., a microcomputer is used as a control unit for interpreting protocol.

FIG. 1B shows a control item in the control unit 81 of the conventional memory card 80.

As stated above, the conventional memory card comprises a body connection interface for connecting to the body of the information equipment, etc. and a memory interface for carrying out input/output of data with respect to the non-volatile memory.

Moreover, conventional video game apparatus as in the home TV game apparatus has a function to store game data, etc. into the auxiliary memory unit. The above-described memory card is used also as an auxiliary memory unit of such video game apparatus.

FIG. 2 shows an example of a conventional video game apparatus using a memory card as an auxiliary memory unit. A body 2 of this conventional video game apparatus (unit) 11 is accommodated within a substantially square casing, and is composed of a disc mounting portion 3 onto which an optical disc, which is a recording medium on which an application program of the video game is recorded, is loaded at the central portion thereof, a reset switch 4 for arbitrarily resetting a game, a power switch 5, a disc operation switch 6 for operating loading of the optical disc, and, e.g., two slot portions 7A, 7B.

Memory card 80 used as the auxiliary memory unit is inserted with respect to these slot portions 7A, 7B, and, e.g., the result, etc. of a game executed on video game unit 11 is sent from the control unit (CPU) 19 and is written into the non-volatile memory 86. In this case, plural operation units (controllers) (not shown) are also connected to the slot portions 7A, 7B so that plural users can carry out waging a war game, etc. at the same time.

As described above, the conventional memory card only comprises a body connection interface for connecting to the body of the information equipment, etc. and a memory interface for carrying out input/output of data with respect to the non-volatile memory. Namely, the conventional memory card only has a function as merely an auxiliary memory unit, and data stored in the non-volatile memory could not be utilized by the memory card alone.

In addition, the conventional video game apparatus can operate an application program only on the game apparatus body, and the game result, etc. can be stored into the memory card device used as the auxiliary memory unit. For this reason, the game result, etc. stored in the memory card could not be effectively reflected for a game executed at times subsequent thereto.

SUMMARY OF THE INVENTION

This invention has been made in view of the above-mentioned problems, and its object is to provide a memory card device which can not only simply store data, but also download an application program to independently execute it, or to carry out cooperative operation while carrying out transmission/reception of its execution result between the memory card device and other information equipment.

Moreover, in order to solve problems as described above, another object of this invention is to provide a video game apparatus capable of downloading an application program of a video game into a memory card used as an auxiliary memory unit from the body of the video game unit, or taking therein the result of a game independently executed on its memory card to carry out cooperative operation to constitute a game executed at times subsequent thereto, etc., and a program providing medium for supplying the application program.

Namely, a memory card device according to this invention comprises a memory for storing data and an interface connecting to information equipment, and functions as an auxiliary memory unit of connected information equipment, the device comprising a program storage memory for storing a program, a control unit for controlling execution of the program, a display unit for displaying information in accordance with the program to be executed, an operation input unit for operating the program, and a power supply unit for supplying power utilized for executing the program.

Moreover, a video game apparatus according to this invention has a function of storing game data obtained by executing a game into an auxiliary memory unit, the apparatus comprising a program providing unit for supplying an application program, a communication control unit connected to a main bus to which a central processing unit of the video game apparatus body is connected, and a slot connected to the main bus through the communication control unit and adapted so that the auxiliary memory unit is detachably connected to the video game apparatus, wherein the central processing unit has a control function to download an application program from the program providing unit with respect to the auxiliary memory unit through the communication control unit.

Further, a video game apparatus according to this invention has a function of storing game data obtained by executing a game with respect to an auxiliary memory unit, the apparatus comprising a program providing unit for supplying an application program, a communication control unit connected to a main bus to which a central processing unit of the video game apparatus body is connected, and a common slot connected to the main bus through the communication control unit and adapted so that the auxiliary memory unit and a memory card unit are detachably connected to the video game apparatus, the auxiliary memory unit having a non-volatile memory for storing game data obtained when the video game apparatus body executes a game, the memory card device including a program memory for storing the downloaded application program, and a control unit for executing the downloaded application program independently of the video game.

Further, a memory card device according to this invention has an interface connectable to information equipment, the memory card device comprising a program storage memory for storing a program, a control unit for controlling execution of the program, a display unit for displaying information in accordance with the executed program, an operation input unit for operating the program, and a power supply unit for supplying power utilized for executing the program, wherein the program is downloaded into the program memory through an interface from the connected information equipment, and the program downloaded into the auxiliary memory unit and the program executed in the information equipment body are application programs which are different from each other.

Further, a program providing medium according to this invention provides an application program with respect to a video game apparatus (unit), wherein at least two different application programs are recorded with respect to the providing medium, and one of the at least two different application programs is an application program executed in the video game unit and the other one is an application program executed in a memory card unit connected to the video game unit.

In accordance with this invention, there can be provided a video game apparatus having a function to download an application program of a video game with respect to a memory card device (unit) capable of independently executing a program of downloaded application software or capable of carrying out cooperative operation while carrying out transmission/reception of its execution result between the memory card unit and other information equipment, and a memory card unit used as an auxiliary memory unit, or to take therein the result of a game independently executed on its memory card unit to carry out cooperative operation to constitute games executed at times subsequent thereto, etc.

DETAILED DESCRIPTION

A preferred embodiment of this invention will now be described with reference to the attached drawings. In the following description, a video game apparatus of the embodiment of this invention will be first described, and a memory card device of the embodiment of this invention will then be described. Finally, by taking, as an example, the case where the memory card device of the embodiment of this invention is applied as an auxiliary memory unit of the video game apparatus of the embodiment of this invention, the cooperative operation therebetween will be described.

Figure 1A:
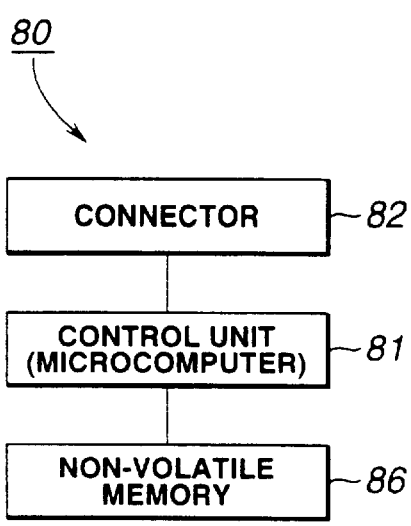
FIGS. 1A, 1B are views showing an example of the configuration of the main part of a conventional memory card device.
Figure 1B:
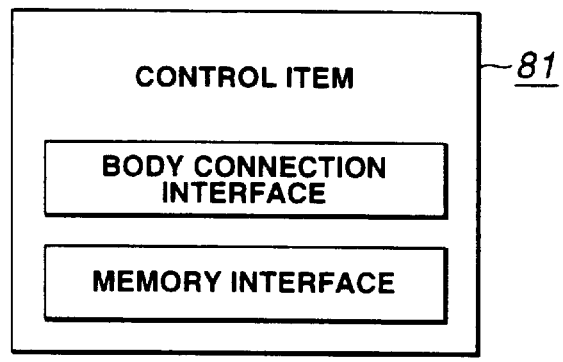
Figure 2:
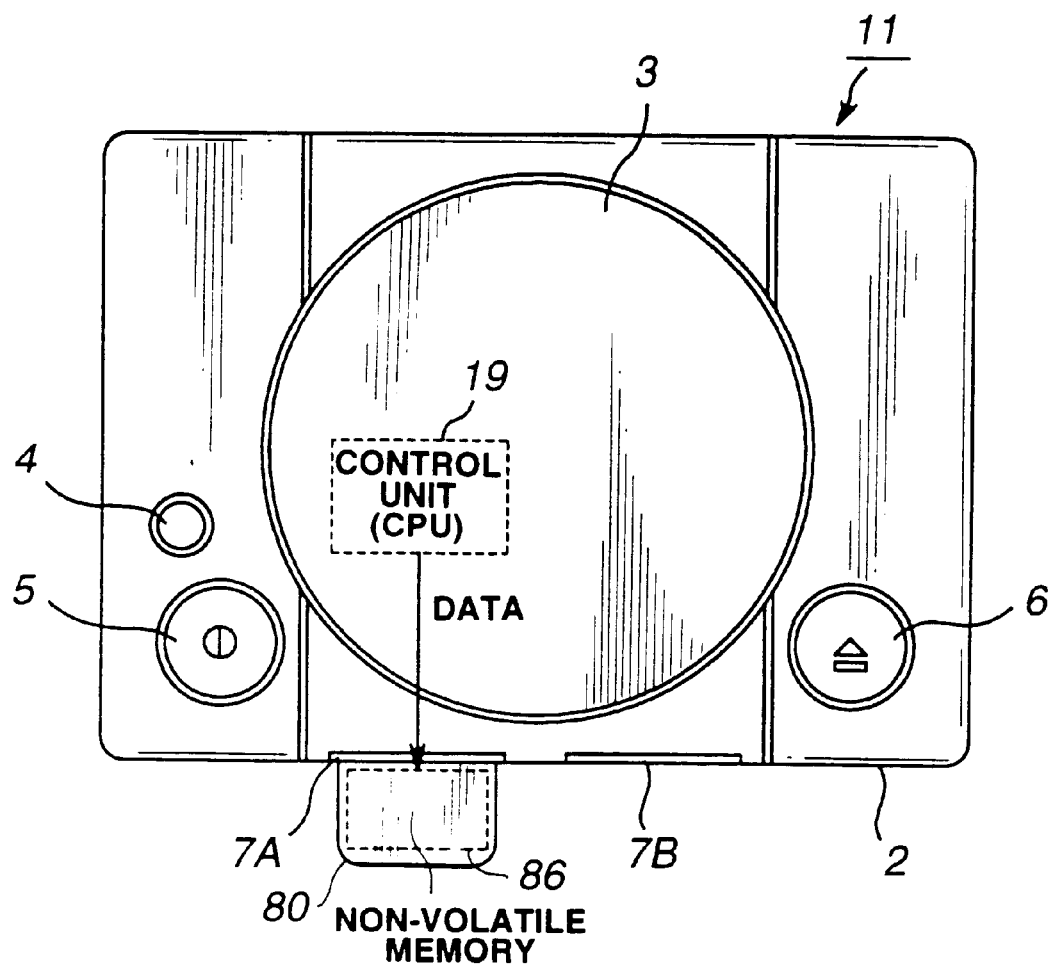
FIG. 2 is a view showing an example of a conventional video game apparatus in which the memory card is used as an auxiliary memory unit.
Figure 3:
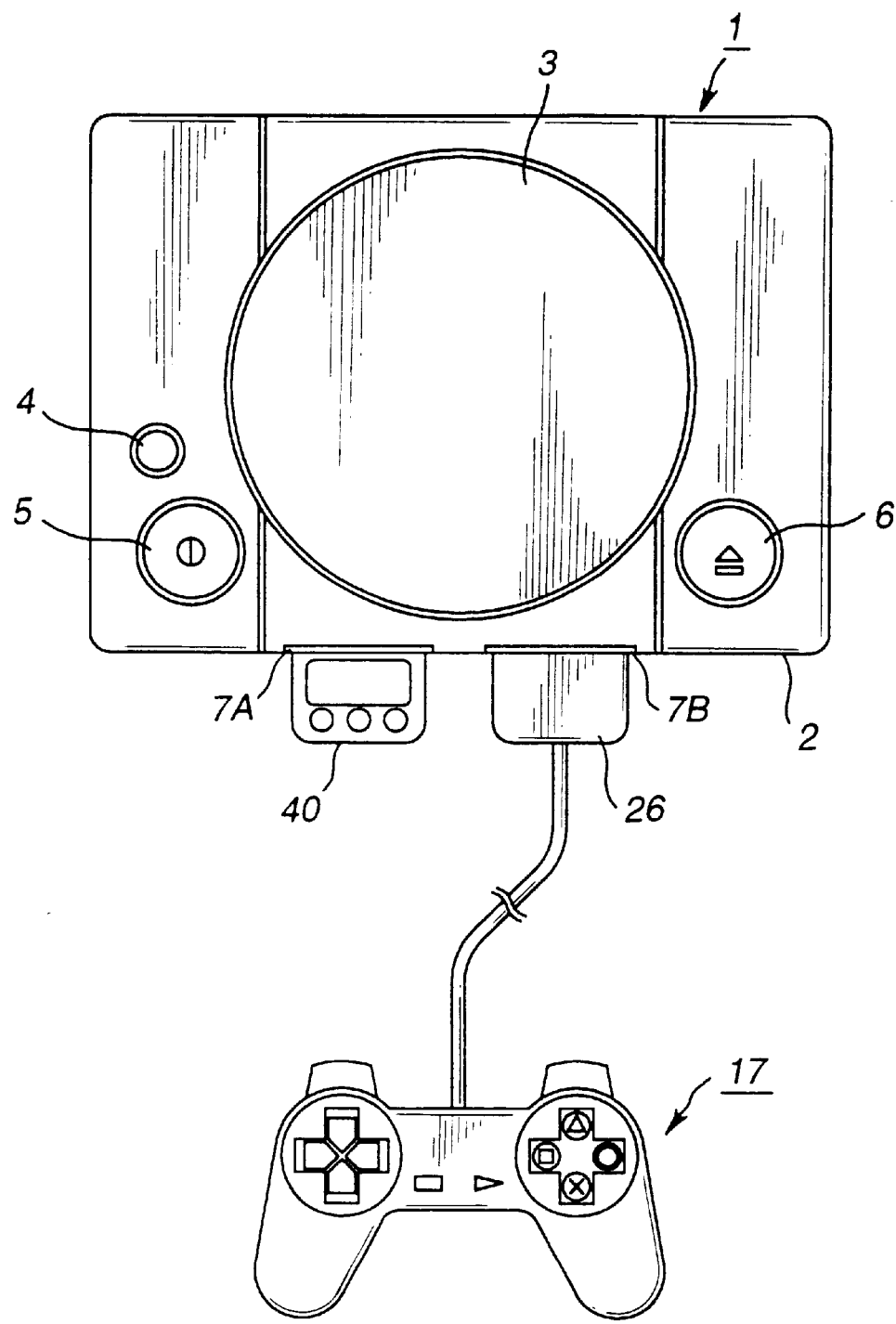
FIG. 3 is a view showing the appearance of a video game apparatus according to this invention.

FIG. 3 shows the appearance of a video game apparatus as one form of the embodiment of this invention. This video game apparatus 1 serves to read out game programs recorded on, e.g., an optical disc, etc. to execute them in accordance with instructions (designations) from the user (game player). In this case, execution of the game refers mainly to progression of the game and the control of the display or speech.

A body 2 of the video game apparatus 1 is accommodated within a substantially rectangular casing, and is caused to be of a configuration comprising a disc loading portion 3 located at the central portion on which an optical disc such as a CD-ROM, etc. which is a recording medium for supplying the application program of the video game is loaded, a reset switch 4 for arbitrarily resetting the game, a power switch 5, a disc operation switch 6 for operating loading of the optical disc, and, e.g., two slot portions 7A, 7B. The configurations of the respective portions are similar to the configurations of those of the previously described conventional video game apparatus 11, and the same reference numerals are respectively attached to common portions thereof.

It is to be noted that the recording medium for supplying the application program is not limited to the optical disc, but a cartridge including a semiconductor memory therein may be employed, or the application program may be supplied through a communication line.

At the slot portions 7A, 7B, two operation units 17 can be connected and two users can carry out waging a war game, etc. In addition, a memory card unit which will be described later may be inserted into these slot portions 7A, 7B. It is to be noted that while the structure provided with slot portions 7A, 7B of two systems is illustrated in FIG. 3, the number of systems is not limited to two.

Figure 4:
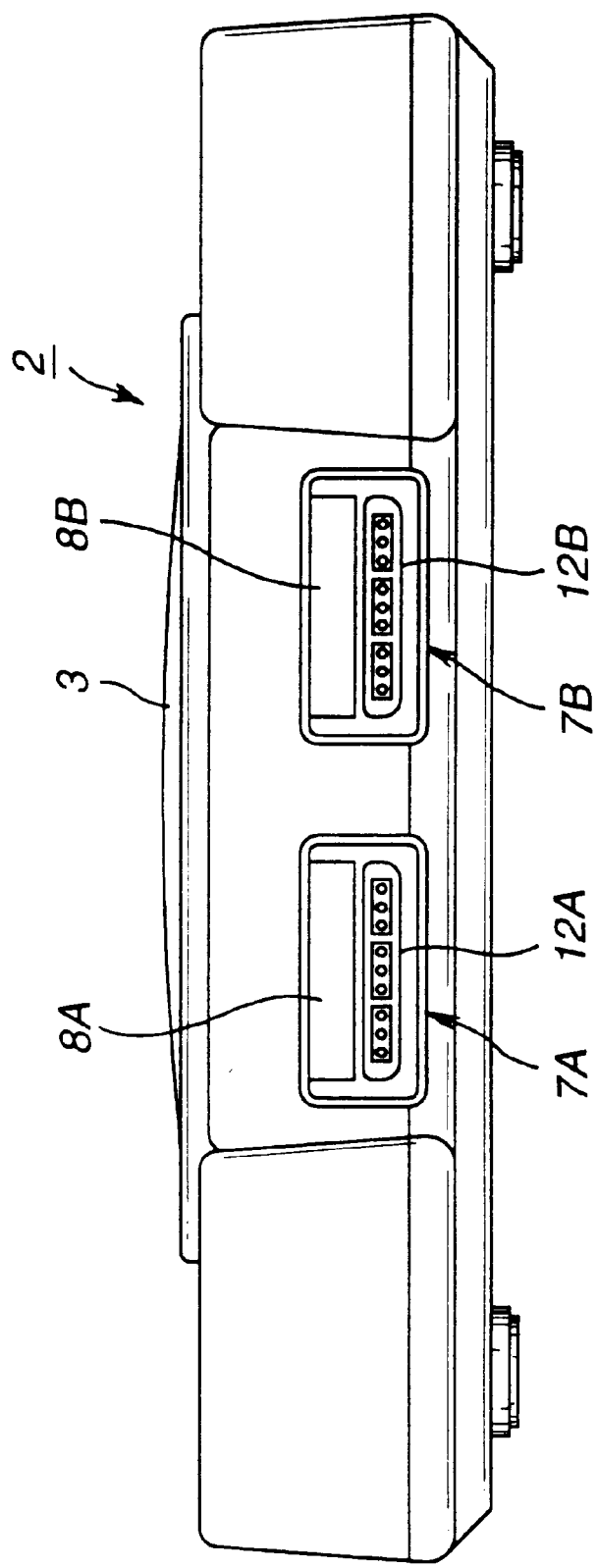
FIG. 4 is a view showing the state of a slot portion of the video game apparatus.

FIG. 4 shows the state of the slot portions 7A, 7B provided at the front side surface of the body 2 of the video game apparatus 1 of the embodiment according to this invention.

In this embodiment, two steps of slot portions 7A, 7B are respectively formed and memory card insertion portions 8A, 8B, into which memory card units 40A, 40B which will be described later are inserted, are respectively provided at their upper steps and controller connecting portions 12A, 12B to which a connection terminal portion 26 of the controller 17 is connected are respectively provided at their lower steps.

Insertion holes (slots) of the memory card insertion portions 8A, 8B are caused to be of a structure in which rectangular insertion holes long in the lateral direction are formed with more rounded corners at both ends at their lower side as compared to the corners at both ends of their upper side so that the memory card unit are not inserted in the wrong direction. In addition, at the memory card insertion portions 8A, 8B, there are respectively provided shutters for protecting connecting terminals therein for obtaining electrical connection with the memory card units.

On one hand, the controller connecting portions 12A, 12B have a structure in which the corners at both ends of the lower side of an insertion hole which is rectangular in the lateral direction are formed with a more rounded shape as compared to the corners at both ends of the upper side so that the connecting terminal portion 26 of the controller 17 is not connected in the wrong direction. Further, the shape of these insertion holes is different from the shape of the memory card insertion portions 8A, 8B so that the memory cards are not erroneously inserted in the wrong insertion holes.

Figure 5:
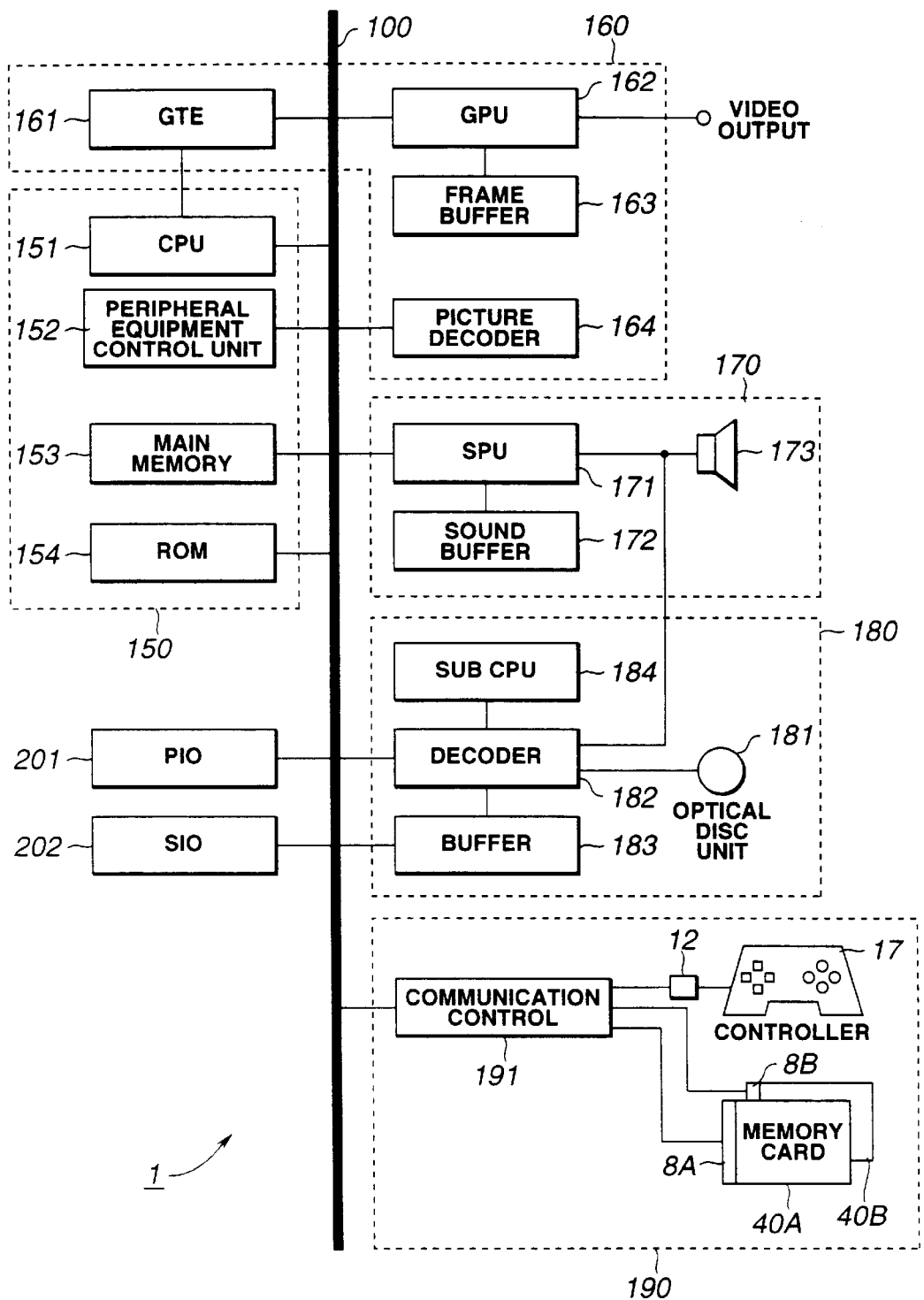
FIG. 5 is a block diagram showing an example of a more practical configuration of the main part of a video game apparatus of the embodiment according to this invention.

FIG. 5 is a block diagram showing an example of a more practical configuration of the main part of the video game apparatus 1.

This video game apparatus 1 has a configuration comprising a control system 150 composed of Central Processing Unit (CPU) 151 and its peripheral equipment, etc., a graphic system 160 composed of a picture processing unit Graphic Processing Unit (GPU) 162 for carrying out picture describing with respect to the frame buffer 163, etc., a sound system 170 composed of Sound Processing Unit (SPU) 171 for generating music or sound effects, etc., an optical disc control unit 180 for carrying out control of optical discs on which application programs are recorded, a communication control unit 190 for carrying out input/output of signals from the controller 17 to which instructions (designations) from a user are input and data from memory card units 40A, 40B for storing settings of a game, etc., and a bus 100 to which the respective portions are connected, etc.

The above-mentioned control system 150 comprises a CPU 151, a peripheral equipment control unit 152 for carrying out interruption control or control of Direct Memory Access (DMA) transfer, etc., a main memory (main memory unit) 153 comprised of a Random Access Memory (RAM), and a Read Only Memory (ROM) 154 in which an operating system program for carrying out the management of graphic system 160 and/or sound system 170, etc. is stored. It is to be noted that the main memory referred to here is adapted to have the ability to execute the program on its memory.

The CPU 151 executes the operating system program stored in the ROM 154 to thereby control the entirety of this video game apparatus 1, and is comprised of, e.g., a RISC-CPU of 32 bits.

Further, this video game apparatus 1 is adapted so that when power is turned ON, the CPU 151 of the control system 150 executes the operating system program stored in the ROM 154 so that the CPU 151 carries out control of the graphic system 160 and/or sound system 170, etc. Moreover, when the operating system program is executed, the CPU 151 carries out initialization of the entirety of the video game apparatus 1, such as confirmation of operation, etc. thereafter to control the optical disc control unit 180 to execute the application program of a game, etc. recorded on the optical disc. By executing the program of a game, etc., the CPU 151 controls the graphic system 160 and/or the sound system 170, etc. in accordance with input from the user to control the display of pictures, and/or generation of sound effects and music.

Moreover, the above-mentioned graphic system 160 comprises a Geometry Transfer Engine (GTE) 161 for carrying out processing of coordinate transform, etc., a GPU 162 for carrying out picture description in accordance with describe instructions (indications) from the CPU 151, a frame buffer 163 for storing pictures described by this GPU 162, and a picture decoder 164 for decoding picture data compression-encoded by orthogonal transforms, such as discrete cosine transforms, etc.

The GTE 161 comprises a parallel arithmetic mechanism for executing in parallel, e.g., plural operations and is adapted to have ability to carry out, at high speed, coordinate transform, light source calculation, and operation of matrix or vector, etc. in accordance with operation requests from the CPU 151. In a more practical sense, in this GTE 161, in the case of an operation for carrying out flat shading to paint, e.g., one triangular polygon by the same color, about 1,500,000 coordinate operations of polygons at the maximum in one second can be carried out. Thus, in this video game apparatus, the load on the CPU 151 is reduced and high speed coordinate operations can be carried out.

Moreover, the GPU 162 carries out a describe operation of a polygon, etc. with respect to frame buffer 163 in accordance with describe instructions from the CPU 151. This GPU 162 can carry out about 360,000 describe operations of polygons at the maximum in one second.

Further, the frame buffer 163 is comprised of a so-called dual port RAM, and is adapted to have the ability to carry out a describe operation from the GPU 162 or transfer from the main memory and read out for display at the same time. This frame buffer 163 has, e.g., a capacity of 1 M bytes, and is dealt as a matrix having 1024 pixels in the lateral direction and 512 pixels in the longitudinal direction, respectively, having 16 bits. Moreover, in this frame buffer 163, there are provided, in addition to the display area output as a video output, a CLUT area in which there is stored a Color Look Up Table (CLUT) to which reference is made when GPU 162 carries out a describe operation of a polygon, etc. and a texture area in which there is stored material (texture) inserted (mapped) into the polygon, etc. described by the GPU 162 after undergoing coordinate conversion at the time of the describe operation. The CLUT area and the texture area are adapted to be dynamically changed in accordance with a change of the display area, etc.

In this example, the GPU 162 is adapted to have the ability to carry out, in addition to the above-described flat shading, glow shading for carrying out interpolation from the color of the vertex of the polygon to determine the color within the polygon and texture mapping for attaching (sticking) texture stored in the texture area onto the polygon. In the case of carrying out such glow shading or texture mapping, the GTE 161 can carry out about 500,000 coordinate operations of polygons at the maximum in one sec.

Further, the picture decoder 164 decodes picture data of still pictures or moving pictures stored in the main memory 153 by control from the CPU 151 to store it into the main memory 153.

Moreover, this reproduced picture data is stored into the frame buffer 163 through the GPU 162 so that it can be used as the background of a picture described by the above-described GPU 162.

The above-mentioned sound system 170 comprises an SPU 171 for generating music or sound effects, etc. on the basis of instructions from the CPU 151, a sound buffer 172 into which waveform data, etc. is recorded by this SPU 171, and a speaker 173 for outputting music or sound effects, etc. generated by the SPU 171.

The above-mentioned SPU 171 has an ADPCM decoding function for reproducing speech (sound) data which has been caused to undergo ADPCM (Adaptive Differential PCM), e.g., speech data of 16 bits being as difference signal of 4 bits, a reproducing function for reproducing waveform data stored in the sound buffer 172 to thereby generate sound effects, etc., and a modulation function for modulating waveform data stored in the sound buffer 172 to reproduce it, etc.

By providing such functions, this sound system 170 can be used as the so-called sampling sound source for generating music or sound effects, etc. on the basis of waveform data recorded in the sound buffer 172 by instruction from the CPU 151.

The above-mentioned optical disc control unit 180 comprises an optical disc unit 181 for reproducing a program or data, etc. recorded on the optical disc, a decoder 182 for decoding a program or data, etc. recorded in the state where, e.g., Error Correction Codes (ECCs) are added, and a buffer 183 for temporarily storing data from the optical disc unit 181 to thereby allow a read-out operation of data from the optical disc to have high speed. A sub CPU 184 is connected to the above-mentioned decoder 182.

Moreover, as speech data recorded on an optical disc which is read out by the optical disc unit 181, there is so called PCM data in which the speech signal has been caused to undergo analog/digital conversion in addition to the above-described ADPCM data.

Speech data recorded in the state where, e.g., a difference of digital data of 16 bits is represented by 4 bits as ADPCM data, is decoded into digital data of 16 bits by the decoder 182, and is then delivered to the above-described SPU 171, at which processing such as digital/analog conversion, etc. is implemented by the SPU 171. The speech data thus processed is used for the purpose of driving the speaker 173.

Moreover, speech data recorded as digital data of, e.g., 16 bits as PCM data is decoded into digital data of 16 bits by the decoder 182, and is then delivered to the above-described SPU 171, at which processing such as digital/analog conversion, etc. is implemented by the SPU 171. The speech data thus processed is used for the purpose of driving the speaker 173.

Further, the communication control unit 190 comprises a communication controller 191 for carrying out control of communication with the CPU 151 through the bus 100, wherein a controller connecting section 12 to which controller 17 for inputting instructions (designations) from the user is connected, and memory card insertion sections 8A, 8B to which memory cards 40A, 40B are connected as auxiliary memory units for storing set data of the game, etc. are provided at the communication controller 191.

The controller 17 connected to the controller connecting section 12 has, e.g., sixteen designation keys for the purpose of inputting designations from the user to transmit the state of this designation key about 60 times per sec. to the communication controller 191 by synchronous communication in accordance with a designation from the communication controller 191. In addition, the communication controller 191 transmits the state of the designation key of the controller 17 to the CPU 151.

Thus, a designation (instruction) from the user is input to the CPU 151. In response thereto, the CPU 151 carries out processing in accordance with the instruction from the user on the basis of the game program, etc. being executed.

In this case, between the main memory 153, the GPU 162, the picture decoder 164 and the decoder 182, etc., it is necessary to transfer a large quantity of picture data at high speed in carrying out read-out of a program, display of a picture or describe operations, etc. In view of this, in this video game apparatus, there can be carried out so-called DMA transfer to directly carry out transfer of data between the main memory 153, the GPU 162, the picture decoder 164 and the decoder 182, etc. by control from the peripheral device control unit 152 without intervening CPU 151 as described above. Thus, load on the CPU 151 by data transfer can be reduced. As a result, high speed data transfer can be carried out.

Moreover, when it is necessary to store set data, etc. of a game being executed, the CPU 151 transmits its stored data to communication controller 191, and the communication controller 191 writes data from the CPU 151 into memory card 40A or memory card 40B inserted into the slot of the memory card insertion portion 8A or the memory card insertion portion 8B.

In this example, a protective circuit for preventing electric breakage is included within the communication controller 191. The above-mentioned memory cards 40A, 40B are separated from the bus 100, and can be attached/detached in the state where power to the device body is turned ON. Accordingly, in the case where the memory capacity of the memory card 40A or 40B is insufficient, etc., a new memory card can be inserted without interrupting the power supply to the device body. For this reason, a new memory card can be inserted so that game data required to be backed up is not lost, but the necessary data is written into the new memory card.

Moreover, a parallel I/O interface (PIO) 201, and a serial I/O interface (SIO) 202 are interfaces for connecting to other external equipment.

The memory card device of the embodiment of this invention will now be described. In the following description, explanation will be given on the premise that the memory card 40 of the embodiment according to this invention is inserted with respect to the video game apparatus 1 of the previously described embodiment according to this invention.

Namely, this memory card device 40 is inserted with respect to the memory card insertion portion 8 provided at the slot portion 7A or 7B of the video game apparatus 1, and can be used as a particular memory card corresponding to connected plural operation units 17. For example, in the case where two users (game players) carry out a game, this device has a conventional function to respectively record their own game results, etc. with respect to two memory cards 40A, 40B.

Figure 6A:
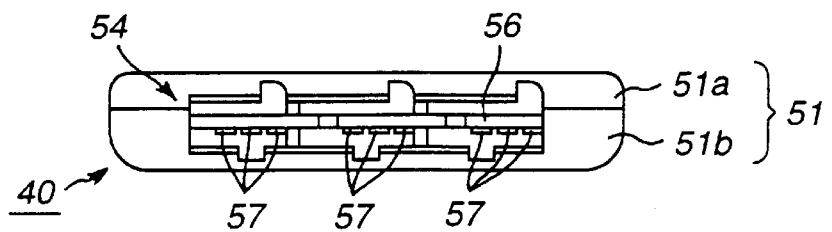
FIGS. 6A, 6B, 6C are views showing the appearance of a memory card device of an embodiment according to this invention.
Figure 6B:
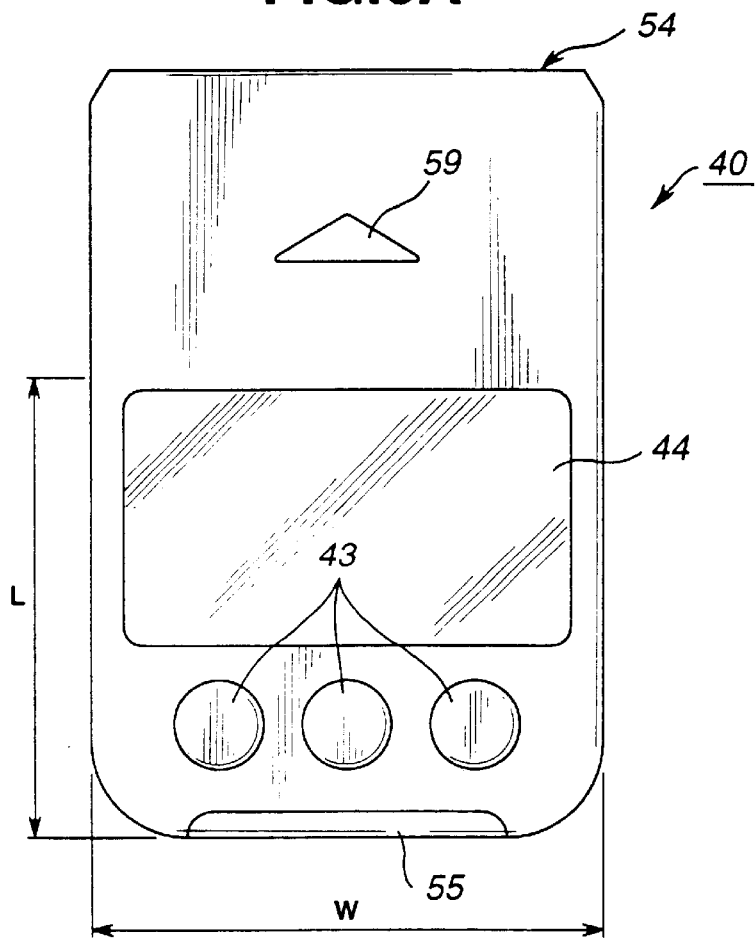
Figure 6C:
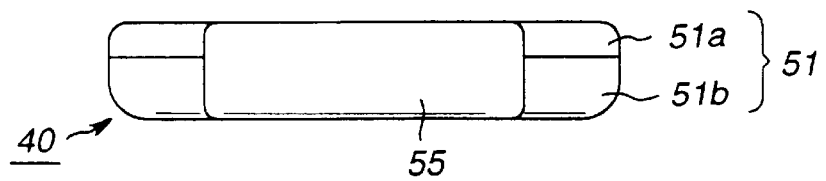

FIGS. 6A to C show the appearance of memory card unit 40 as one embodiment of this invention. The upper surface of the memory card unit 40 is shown in FIG. 6B, the side surface of the insertion side thereof is shown in FIG. 6A, and the surface of the opposite side is shown in FIG. 6C.

As stated above, the memory card unit 40 of the embodiment of this invention is different in appearance from the conventional memory card in that it includes a button switch 43 for inputting an event, a display screen 44 of a liquid crystal display device (LCD), etc. and a wireless communication window 55 for carrying out wireless communication by, e.g., infrared rays in wireless communication means 48 which will be described later.

In this example, the shape and/or dimensions W, L, etc. of the connector portion 54 are similar to those of the conventional memory card 80 used in the conventional video game device 11.

This memory card device 40 is composed of a housing 51 composed of an upper shell 51a and a lower shell 51b formed so that housing 51 is substantially rectangular, and a base (substrate) 56 on which a memory element, etc. is mounted within this housing 51. The housing 51 is adapted to be inserted into slot portions 7A, 7B of the body of the video game unit 1, and a connector portion 54 in which a rectangular window is formed is provided in its end surface. Terminals 57 for power and signal are disposed on the base 56 within the window of this connector portion 54, and are faced thereto. In addition, at the side surface opposite to the side of the connector portion 54 of the housing 51, there is provided a wireless communication window 55 for carrying out the above-described wireless communication.

At the upper surface of the housing 51, there is provided a direction indication mark 59 indicating the direction in which this memory card unit 40 is inserted into slot portions 7A, 7B of the body of the video game unit 1. The user can discriminate, with ease, its direction of insertion into the game apparatus body 2 by this mark 59. It is to be noted that the mark 59 is not limited to the shape illustrated in FIG. 6B, and may have a shape which can be utilized as a stop of slipping off in attaching/detaching the memory card unit 40 with respect to slot portions 7A, 7B of the body of the video game apparatus 1.

Figure 7B:
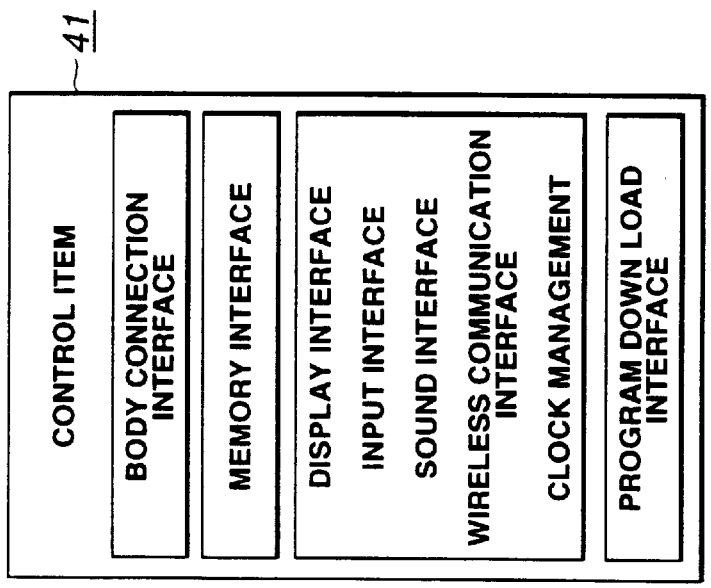
FIGS. 7A, 7B are block diagrams showing an example of the configuration of the main part of the memory card device of the embodiment according to this invention.
Figure 7A:
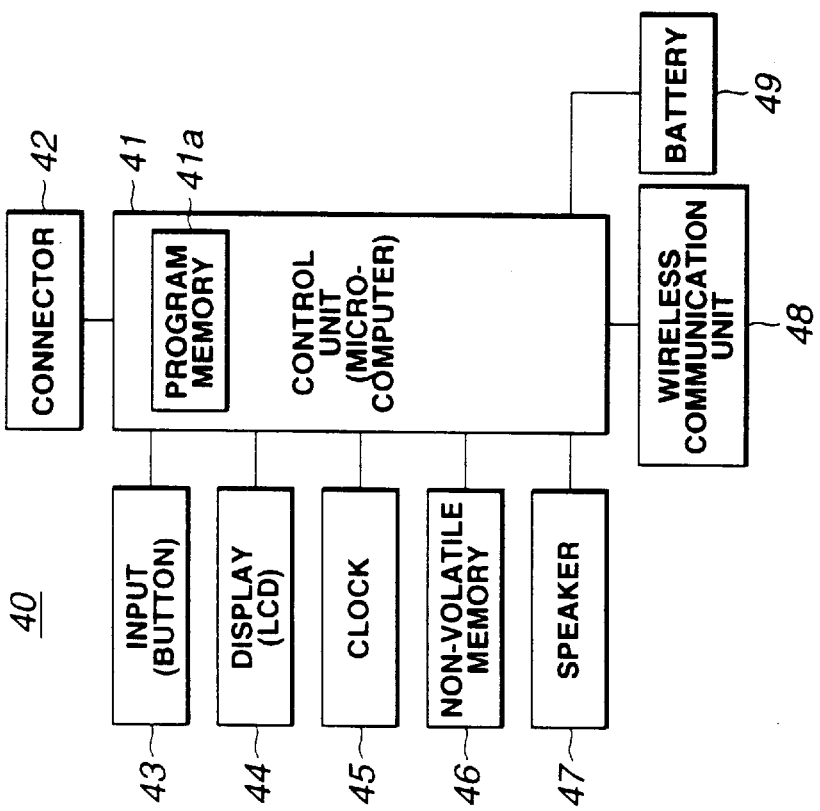

FIG. 7A is a block diagram showing an example of the configuration of the principal part of the memory card device 40.

Similarly to the previously described conventional memory card 80, the memory card unit 40 comprises a control unit 41 for controlling its operation, a connector 42 for connecting to the slot of information equipment, etc., and a non-volatile memory 46 serving as element for storing data.

The control unit 41 is constituted by using, e.g., a microcomputer, and includes therein a program memory portion 41a for storing a program. In addition, as non-volatile memory 46, there is used a semiconductor memory element in which, even if power is turned OFF, the recorded state is left like a flash memory. It is to be noted that as the memory card device 40 of the embodiment of this invention, because it is caused to be of a configuration comprising a battery 49 as described later, there may be used as non-volatile memory 46 a Static Random Access Memory (SRAM) which can carry out input/output of data at high speed.

The memory card unit 40 differs from the above in that it comprises, in addition to the above-mentioned configuration, a button switch (operation (event) switch) 43 for operating a program stored therein, a display screen 44, such as a liquid crystal display unit (LCD), etc., for displaying various information in accordance with the program, a wireless communication section 48 for carrying out transmission/reception of data by infrared rays between this memory card unit 40 and other memory card units, etc., and a battery 49 for supplying power to the respective portions.

Moreover, the memory card device 40 includes therein a small battery 49 for supplying power. For this reason, even in the state where it is taken out from the slot portions 7A, 7B of the video game apparatus 1, the memory card device 40 can be operated by itself. In this example, the battery 49 may be chargeable, and there may be employed a configuration such that, in the state where the memory card device 40 is inserted into the slot portions 7A, 7B of the body of the video game apparatus 1, power is supplied from the video game apparatus 1.

This memory card device 40 further comprises a clock 45 and a speaker 47 for producing sound in accordance with the program. In this example, the above-mentioned respective portions are all connected to the control section 41, and are operative in accordance with control of the control section 41.

FIG. 7B shows a control item of the control section 41. While conventional memory card 80 only comprises a body connection interface to information equipment and a memory interface for carrying out input/output of data to the memory, the memory card device 40 of the embodiment of this invention comprises, in addition to the above-mentioned interfaces, a display interface, an operation input interface, a speech (sound) interface, a wireless communication interface, a clock manager and a program download interface.

Since the memory card device 40 is adapted so that the control unit (microcomputer) 41 has an interface (driver) for carrying out management of functions supplemented by this invention independently of the body connection interface and the non-volatile memory management which are the conventional functions, compatibility with the conventional functions can be maintained.

Moreover, since this memory card device 40 has a configuration comprising button switch 43 for operating a program to be executed and display screen 44 using a Liquid Crystal Display unit (LCD), etc., when a game application is caused to be operative, an application as a portable game apparatus can be made.

In addition, since this memory card device 40 has the function of storing an application program to be downloaded from the body of the video game apparatus 1 into program memory section 41a within the microcomputer 41, it is possible to easily change the application program or various driver software operated on the memory card device 40.

As explained above, the memory card device 40 of the embodiment of this invention can control operation independently of the video game apparatus 1. Accordingly, at the memory card device 40 side, it is possible to independently prepare data by an application stored in the program memory section 41a for storing a program independently of application software of the video game apparatus 1 side. Moreover, by carrying out transmission/reception of this data to and from the video game apparatus 1, cooperative operation (link) between the memory card device 40 and the video game apparatus 1 can be made.

Further, as the result of the fact that the memory card device 40 comprises a clock 45, time data can be shared with the video game apparatus 1 side. Namely, not only are respective time data caused to be in correspondence with each other, but also data for controlling, in accordance with the actual time, the progression of a game that respective sides independently execute can be shared.

A more practical example of the cooperative (link) operation between the video game apparatus 1 and the memory card device 40 which are described above will be described later.

Figure 8:
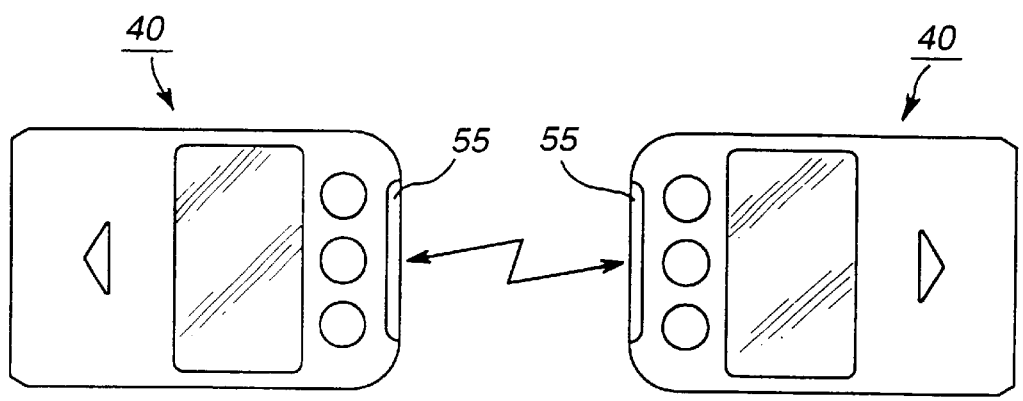
FIG. 8 is a view for explaining the wireless communication function of the memory card device of the embodiment according to this invention.

FIG. 8 shows, in a model form, the state where wireless communication is carried out between memory card devices 40 of the embodiment of this invention. As stated above, the memory card device 40 is adapted to carry out transmission/reception of data through wireless communication windows 55 for carrying out wireless communication by infrared rays, etc. at the wireless communication section 48, thereby making it possible to carry out transmission/reception of internal data between plural memory card devices. In this example, the above-mentioned internal data is assumed to include, as well, data transferred from the information equipment side, e.g., the video game apparatus, etc., and stored in the storage memory (program memory 41a, non-volatile memory 46) within the memory card device.

It is to be noted that while an explanation has been given in the above-described embodiment of the use of the memory card device of the embodiment of this invention as an auxiliary memory unit of the video game apparatus, applications of the memory card device of the embodiment of this invention are not limited to the video game apparatus. For example, it is a matter of course that this invention can be applied to retrieval, etc. of various information, etc.

The cooperative operation between the memory card device 40 and the video game apparatus 1 of the previously described embodiment of this invention will now be described.

As previously described, the memory card device 40 can share game data generated by the microcomputer 41 serving as the control unit, time data obtained at the clock 45 within the memory card, and data generated at other memory cards obtained through wireless communication unit 48, etc. with the body of the video game apparatus 1.

Figure 9:
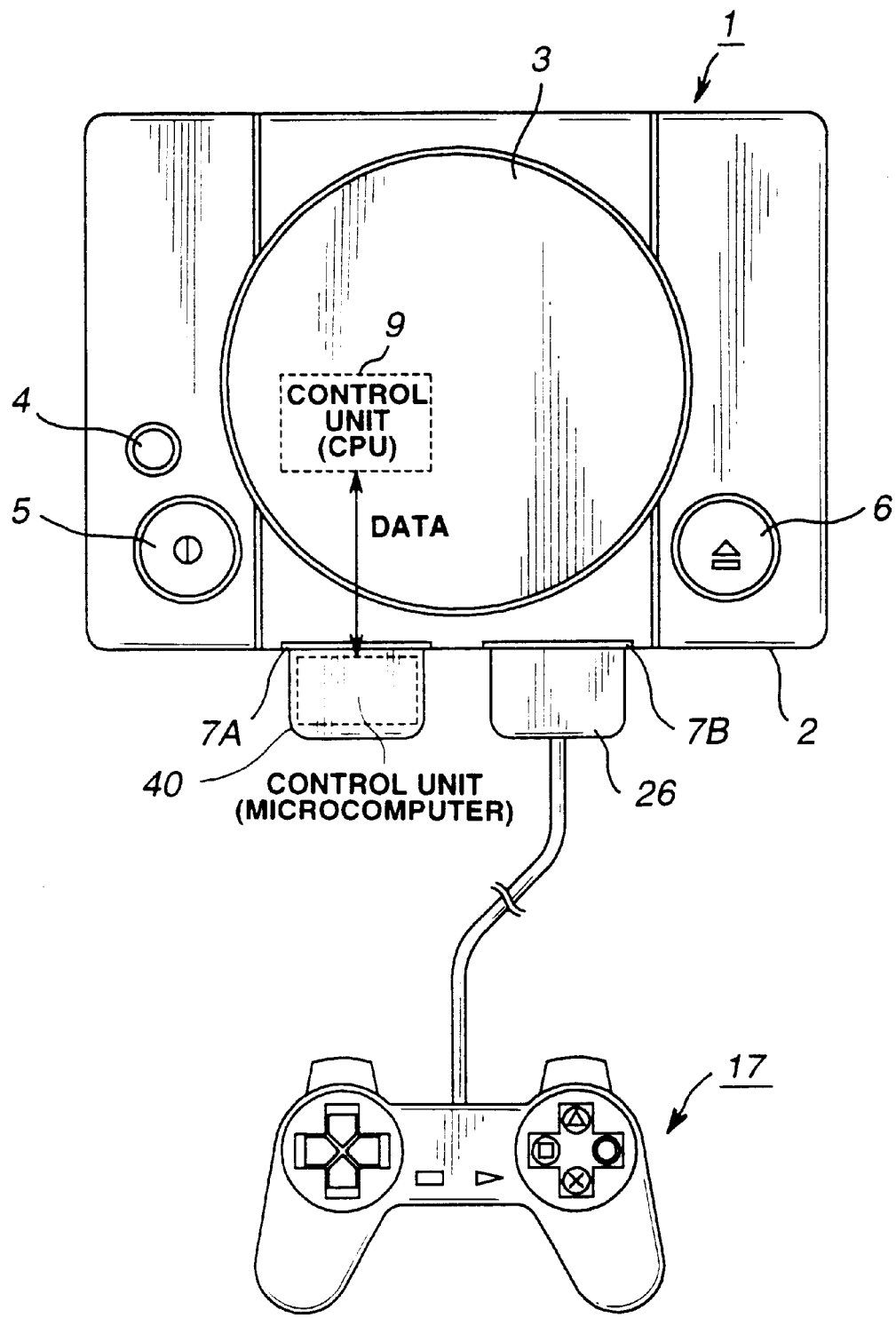
FIG. 9 is a view for explaining cooperative operation between the video game apparatus body and the memory card of the embodiment according to this invention.

FIG. 9 shows, in a model form, the state where cooperative operation is carried out between the video game apparatus 1 and the memory card device 40.

An explanation will now be given, as an example of such cooperative operation, for the case where an optical disc (CD-ROM), serving as the recording medium on which application software is recorded, is loaded with respect to the body of the video game apparatus 1 and a program which has been read out therefrom is downloaded into the memory card device 40 inserted into the slot portion 7A or 7B of the body of the video game apparatus Initially, prior to a more practical explanation with respect to the cooperative operation, an explanation will be given in connection with the download of a program serving as the premise for carrying out the cooperative operation.

Figure 10:
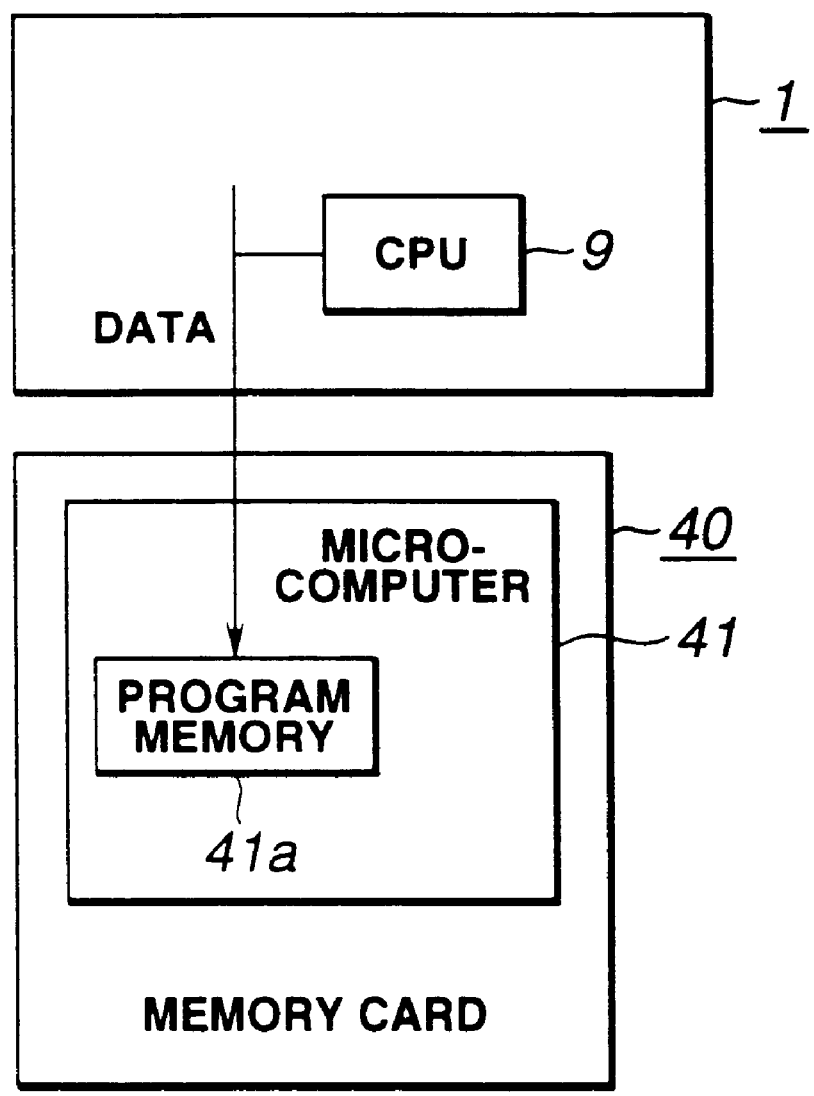
FIG. 10 is a view showing flow of program data which is downloaded into the memory card from the video game apparatus body.

FIG. 10 shows the flow of data in the case where the application program of a video game delivered from an optical disc (CD-ROM), etc. loaded with respect to the disc loading portion 3 of the video game apparatus 1 is directly transferred (downloaded) into the program memory portion 41a for storing the program within the microcomputer 41 serving as the control unit of the memory card device 40 through CPU 9 serving as the control unit of the video game apparatus 1.

Figure 11:
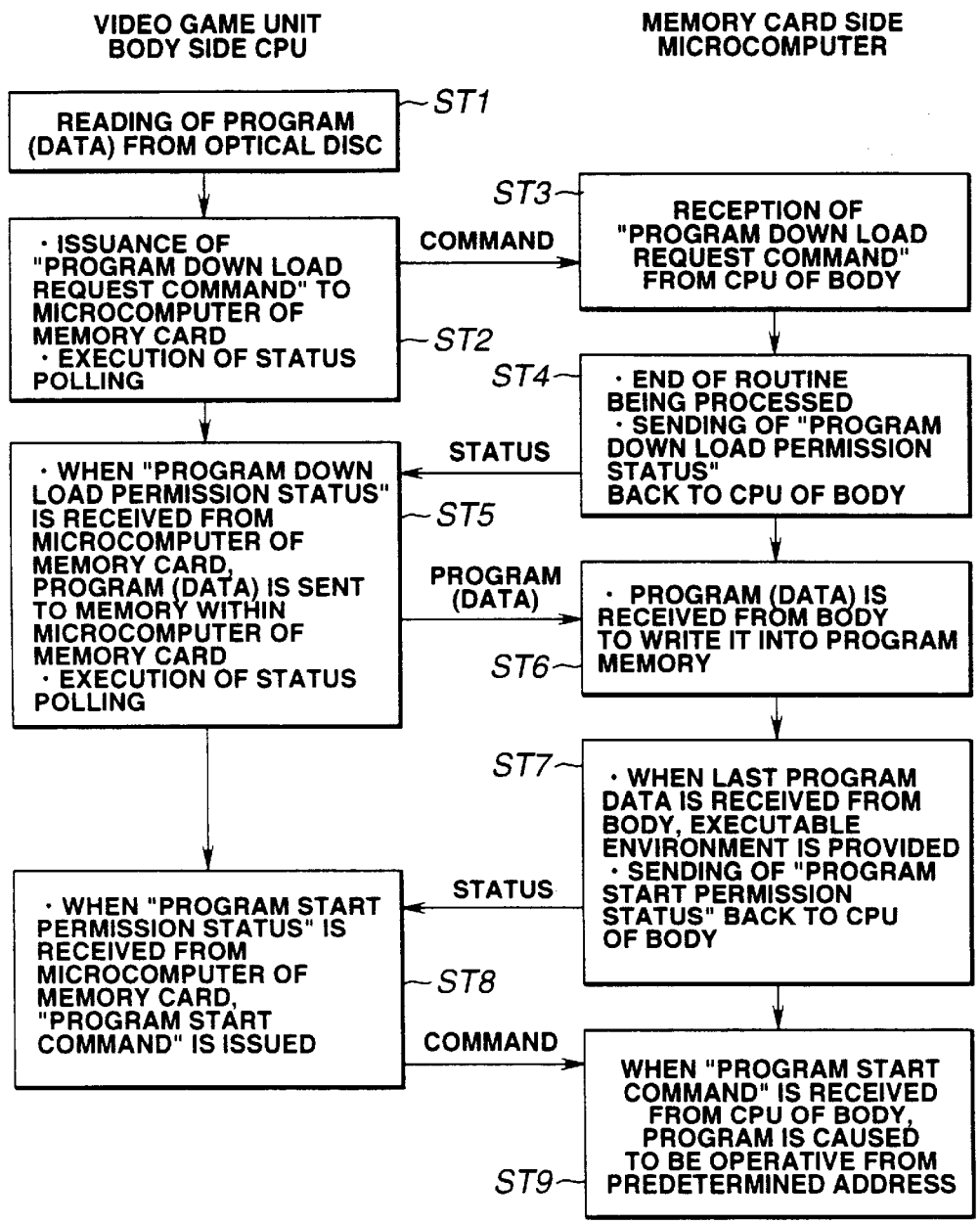
FIG. 11 is a view showing the procedure of the download.

FIG. 11 shows the procedure of the above-mentioned download.

At step ST1, the application program of a video game operated on the microcomputer within the memory card device 40 is read out as data from the CD-ROM loaded with respect to disc loading portion 3 of the body of the video game apparatus 1 (hereinafter simply referred to as body). It is to be noted that, as previously described, in general, this application program is different from the program operated on the body of the video game apparatus 1.

Then, at step ST2, the CPU 9, serving as the control section of the body, issues a "Program Download Request Command" to the microcomputer 41 serving as the control unit of the memory card device 40. Further, the CPU 9 carries out polling for receiving the "Program Download Permission Status" from the microcomputer 41. In this case, the polling referred to here is a method of inquiring as to the presence/absence of a service request to carry out service.

At step ST3, the microcomputer 41 of the memory card device 40 side receives the "Program Download Request Command" from the CPU 9 of the body.

Further, at step ST4, when the microcomputer 41 of the memory card side completes the routine being processed so that there results the state where program download can be executed, it sends the "Program Download Permission Status" back to the CPU 9 of the body.

Then, when the CPU 9 of the body receives the "Program Download Permission Status" from the microcomputer 41 of the memory card device 40 side at step ST5, it transfers (downloads) the program which has been read out from the CD-ROM, etc. at the step ST1 to the program memory section 41a for storing the program of the memory card device 40 to write it therein. Further, the CPU 9 carries out polling for the purpose of receiving the "Program Start Permission Status" from the microcomputer 41.

At this time, the address of the program memory section 41a into which downloaded data is written is caused to undergo management by the microcomputer 41. Moreover, while the case where the program downloaded from the body is stored into the program memory section 41a within the microcomputer 41 has been given as an example in the above explanation, such program may be stored into a memory element such as an SRAM, etc. capable of carrying out input/output of data at high speed.

At step ST6, the microcomputer 41 of the memory card device 40 receives, as data, the program transferred from the body to write it into the program memory section 41a. At this time, the program data is directly written into the program memory section 41a of the memory card device 40 from the CPU 9 of the body. In addition, as described above, the address of the program memory section 41a is caused to undergo management by the microcomputer 41 as described above.

Then, at step ST7, when the microcomputer 41 of the memory card device 40 receives the last program data from the body so that there results an executable environment, it sends the "Program Start Permission Status" back to the CPU 9 of the body.

At step ST8, the CPU 9 of the body receives the "Program Start Permission Status" from the microcomputer 41 of the memory card device 40 and issues the "Program Start Command".

Further, at step ST9, when the microcomputer 41 of the memory card device 40 receives the "Program Start Command" from the CPU 9 of the body, it operates the program from a predetermined address determined in advance.

By the procedure described above, the application program is directly transferred (downloaded) from the body of the video game apparatus 1 into the program memory section 41a provided within the microcomputer 41 of the memory card device 40 inserted with respect to the body.

It is to be noted that the medium for delivering the application program is not limited to a recording medium such as an optical disc, etc. as previously described, but such application program may be delivered through a communication line. In that case, only step ST1 is different in the above-mentioned procedure.

Meanwhile, the above-mentioned download procedure has been described for the situation in which the application program is directly downloaded from the body of the video game apparatus 1 into the program memory section 41a within the microcomputer 41 serving as the control unit of the memory card device 40 inserted with respect to the body.

On the contrary, there are instances where the CPU 9 of the body downloads data of the application program into the non-volatile memory 46 within the memory card device 40 thereafter to copy that data into the program memory section 41a within the microcomputer 41 to execute it.

Figure 12:
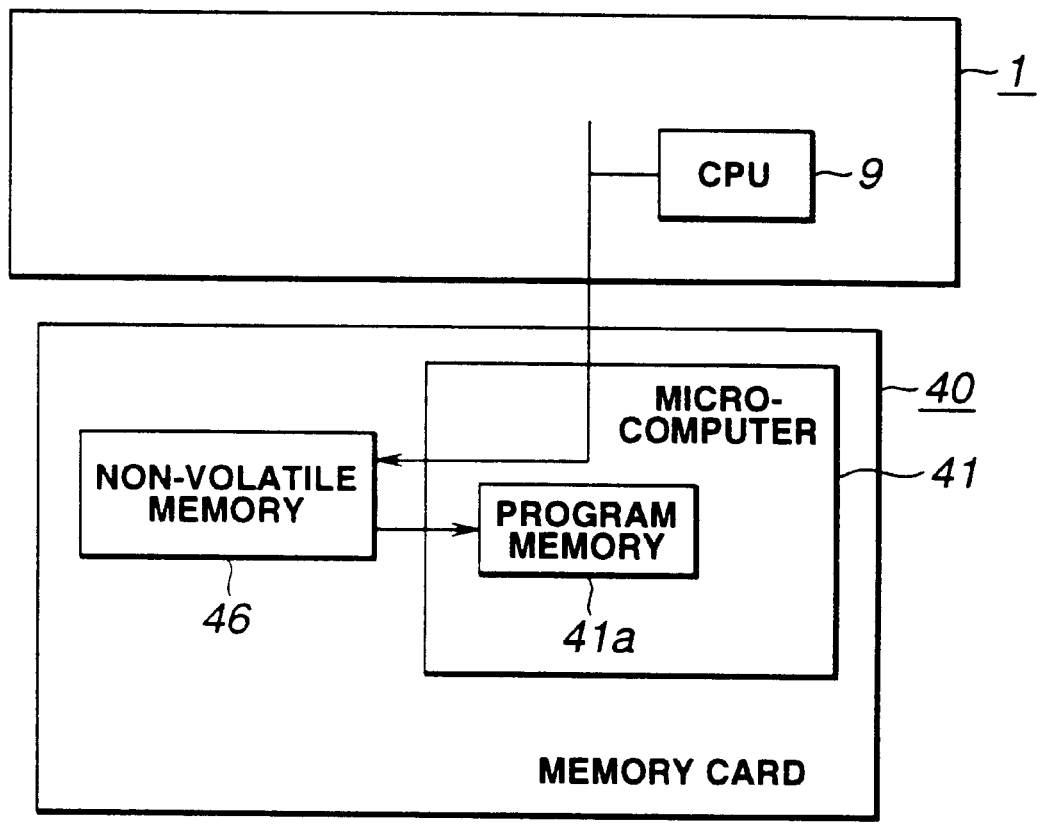
FIG. 12 is a view showing another flow of program data which is downloaded into the memory card from the video game apparatus body.

FIG. 12 shows the flow of data in such a case. Namely, the application program of a video game delivered from an optical disc, etc. loaded with respect to the disc loading section 3 of the video game apparatus 1 is transferred (downloaded) into the non-volatile memory 46 within the memory card device 40 through the CPU 9 serving as the control unit of the video game apparatus 1, and is then copied into the program memory section 41a within the microcomputer 41 serving as the control unit so that it is executed.

Figure 13:
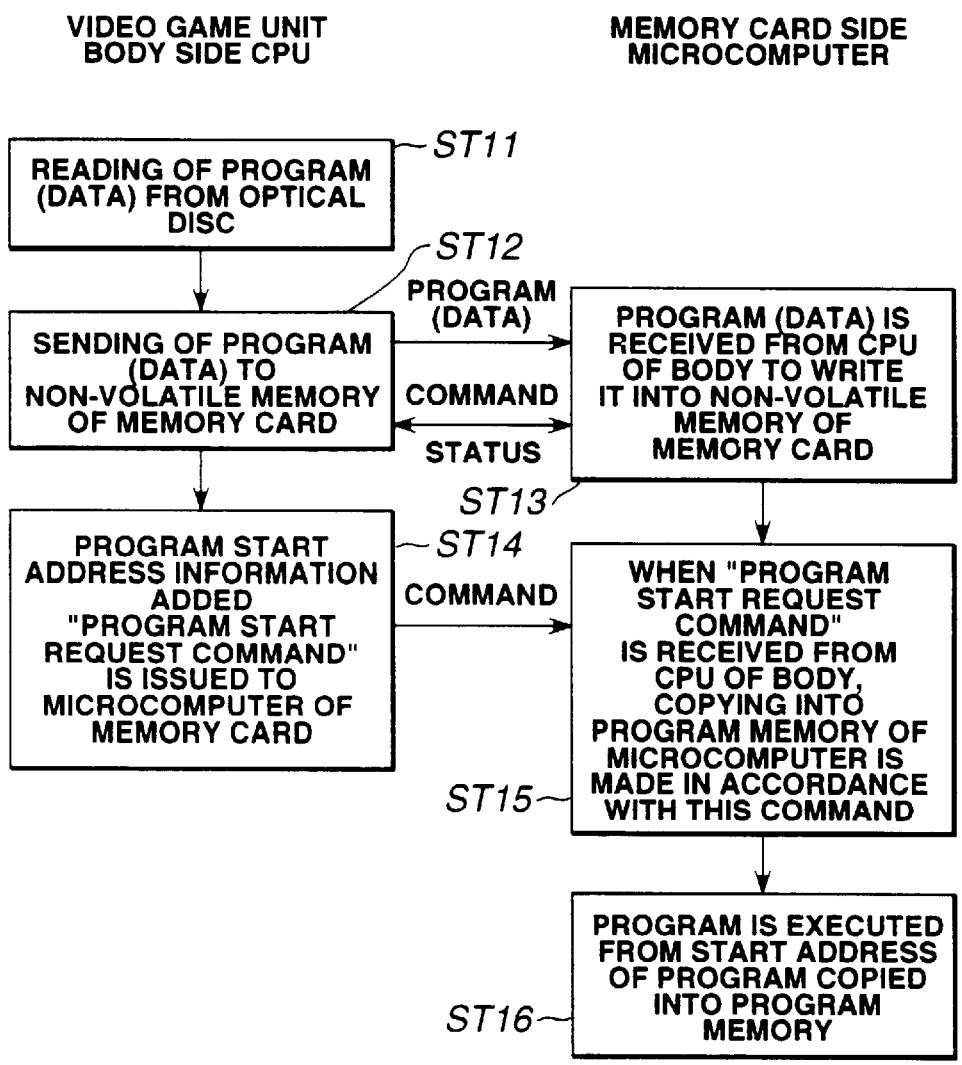
FIG. 13 is a view showing the procedure of the download.

FIG. 13 shows the procedure of the above-mentioned download.

At step ST11, the application program of a video game operated on the microcomputer within the memory card device 40 is read out as data from a CD-ROM loaded with respect to the disc loading section 3 of the body of the video game apparatus 1 (hereinafter simply referred to as body).

Then, at step ST12, the CPU 9 serving as the control unit of the body transfers (downloads) the program data which has been read out from the CD-ROM into the non-volatile memory 46 of the memory card device 40. This procedure is similar to the case where back-up of data is carried out in the conventional video game apparatus 11, etc.

Then, at step ST13, the microcomputer 41 serving as the control section of the memory card device 40 receives, as data, the application program transferred from the CPU 9 of the body by the procedure similar to the conventional data back-up to write it into the non-volatile memory 46.

Then, at step ST14, when the microcomputer 41 of the memory card device 40 receives the "Program Start Request Command" from the CPU 9 of the body, it copies data of a designated size into the program memory section 41a within the microcomputer 41 from the address designated by the command of the non-volatile memory 46.

Then, the microcomputer 41 of the memory card device 40 executes the program copied into the program memory section 41a from its start address.

By the above-mentioned procedure, the application software is transferred (downloaded) from the body of the video game apparatus 1, as data, through the non-volatile memory 46, into the program memory section 41a provided within the microcomputer 41 of the memory card device 40 inserted with respect to the body.

It is to be noted that, in general, the application program downloaded from the video game apparatus 1 into the memory card device 40 is different from the program operated on the body of the video game apparatus 1. It is a matter of course that the downloaded application program may be a program operated both on the video game apparatus 1 and on the memory card device 40. In this case, the CPU of the video game apparatus 1 side and the microcomputer of the memory card device 40 side would be the same processor.

An explanation will now be given in connection with the cooperative (link) operation in which application programs downloaded by the previously described procedure from the body of the video game apparatus 1 are independently executed on the memory card device 40 to carry out transmission/reception of its execution result between the memory card device 40 and the video game apparatus 1.

In this example, attribute data of persons or characters who appear on the so-called role playing game, etc., which is operated on the body of the video game apparatus 1, is downloaded into the memory card device 40. In this case, the above-mentioned attribute data is data representing the degree of growth and/or characters, etc.

Then, dramatis personae or characters are brought up on the program executed by the microcomputer 41 within the memory card device 40 to thereby change those attributes in a manner independent of the program executed in the body of the video game apparatus 1.

Figure 14:
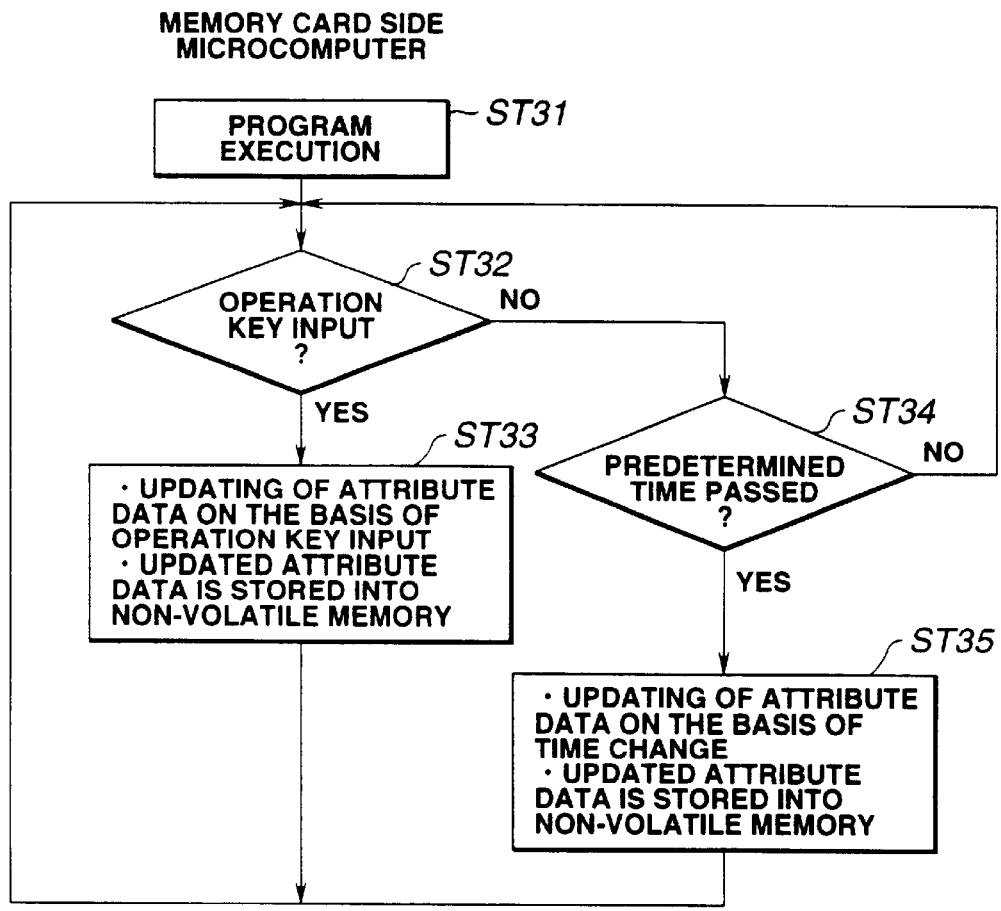
FIG. 14 is a view showing the procedure for bringing up dramatis personae or characters on the memory card device.

FIG. 14 shows a procedure for bringing up dramatis personae or characters on the memory card device 40.

At step ST31, the user initially pushes down button switch 43 of the memory card device 40, whereby the execution of an application program is started.

Then, at step ST32, a judgment is made as to whether data input for bringing up dramatis personae or characters has been input through button switch 43. In the case where data has been input, processing proceeds to step ST33. In the case where no data has been input, processing proceeds to step ST34.

At the step ST33, attribute data is updated (changed) on the basis of data input from the button switch 43. Further, the updated (changed) attribute data is stored into the non-volatile memory 46.

Moreover, in the case where processing proceeds to the step ST34, a judgment is made as to whether a predetermined time has been passed by utilizing the clock included therein. In the case where the predetermined time has passed, processing proceeds to step ST35.

At the step ST35, attribute data is updated (changed) on the basis of the time change. Further, the updated (changed) attribute data is stored into the non-volatile memory 46.

By repeating the above-described operation, it is possible to vary the attribute data on the memory card device 40 independently of the program executed at the body of the video game apparatus.

Such memory card device 40 of the embodiment of this invention is constituted so that it is operative by itself and is compact and convenient for portability. For this reason, the user (game player) can carry, at any time, dramatis personae or characters who appear by the program executed on this memory card device 40. Moreover, the user can also transfer (up load) attributes of dramatis personae or characters brought up at hand to the body of video game apparatus 1 from the memory card device 40. In this case, it is also possible to take therein dramatis personae or characters of whom attributes have been changed into a program executed on the body of the video game apparatus 1 to operate them.

Figure 15:
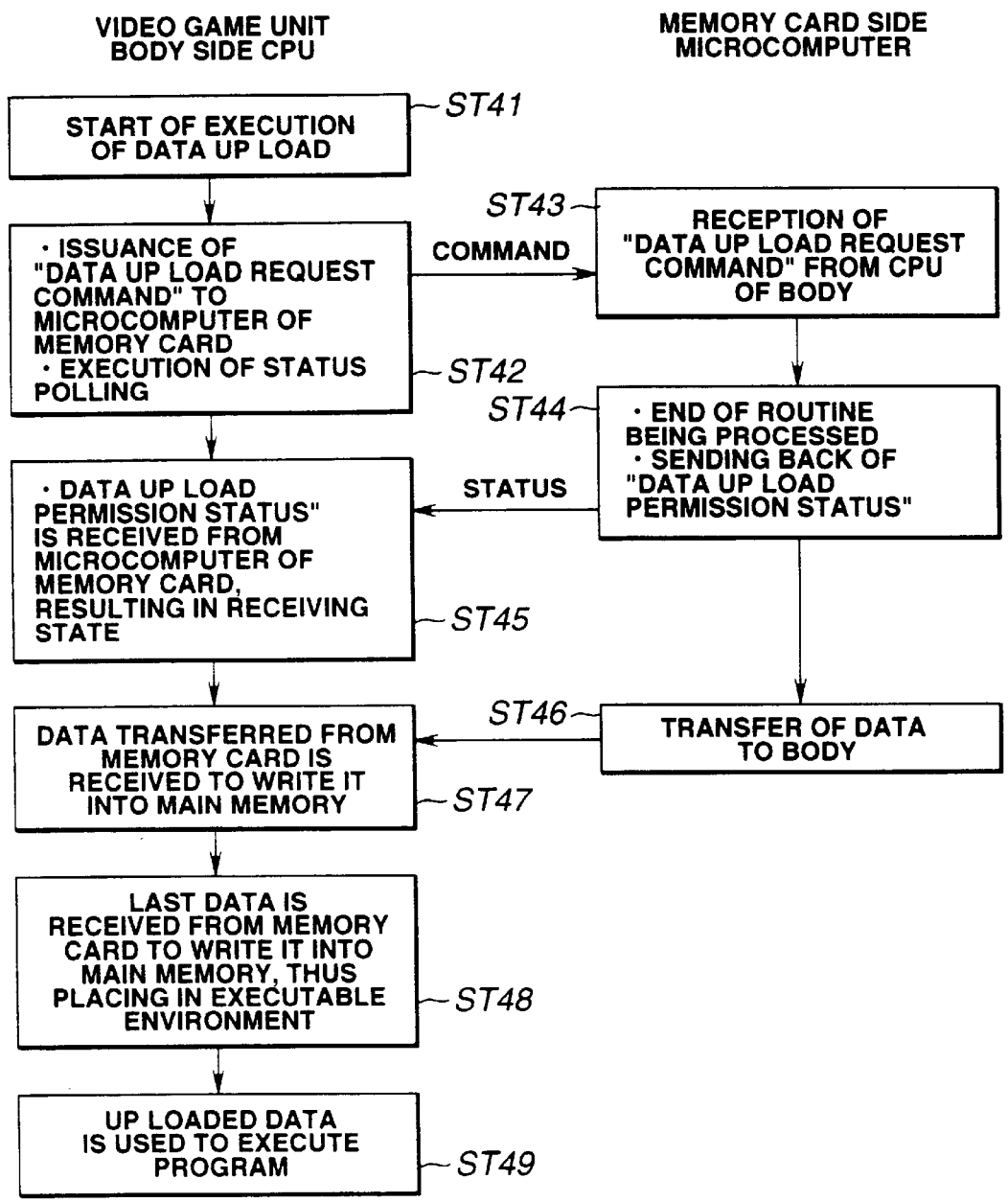
FIG. 15 is a view showing the procedure for transferring (up-loading) the attributes (attribute data) of the dramatis personae or characters that a user has brought up on the memory card device to the body of the video game apparatus from the memory card device.

FIG. 15 shows a procedure for transferring (up loading) attributes (attribute data) of dramatis personae or characters that the user has brought up on the memory card device 40 from the memory card device 40 to the body of the video game apparatus 1.

At step ST41, initially, by an instruction that the user inputs through the controller connected to the body of the video game apparatus 1, the execution of the up load of attribute data is started.

Then, at step ST42, the CPU 9 serving as the control unit of the body issues a "Program Up Load Request Command" to the microcomputer 41 serving as the control unit of the memory card device 40. Further, the CPU 9 carries out polling for the purpose of receiving the "Program Up Load Permission Status" from the microcomputer 41.

At step ST43, the microcomputer 41 of the memory card device 40 side receives a "Program Up Load Request Command" from the CPU 9 of the body.

Further, at step ST44, when the microcomputer 41 of the memory card device 40 side completes the routine being processed so that the program up load can be executed, it sends the "Program Up Load Permission Status" back to the CPU 9 of the body.

Then, at step ST45, the CPU 9 of the body receives the "Program Up Load Permission Status" from the microcomputer 41 of the memory card device 40 side, resulting in a receiving state of attribute data from the memory card device 40.

At step ST46, the microcomputer 41 of the memory card device 40 reads out the attribute data from the non-volatile memory 46 to transfer (up load) the attribute data to the body of the video game apparatus 1. Further, the CPU 9 of the video game apparatus 1 receives the attribute data at step ST47 to write it into the main memory 153. At this time, the address of the main memory section 41a into which up-loaded attribute data is written is caused to undergo management by the microcomputer 41.

Further, at step ST48, the CPU 9 of the body of the video game apparatus 1 receives the last attribute data from the memory card device 40 to set an environment such that attribute data representing the changed dramatis personae or characters can be utilized in an application program executed on the body of the video game apparatus 1 to inform the user that the current environment is set to that environment.

Further, in the case where it is instructed (indicated) by the user to execute the application program at the newly set environment, i.e., by using up-loaded attribute data, the CPU 9 of the video game apparatus 1 executes its application program at step ST49.

By the above-mentioned procedure, it is possible to execute, on the video game apparatus, an application program reflecting attribute data of dramatis personae or characters independently changed on the memory card device 40.

It is to be noted while such a procedure is taken at step ST46 in the above-described flowchart to allow the microcomputer of the memory card device 40 to transfer attribute data of the non-volatile memory 46 to the video game apparatus 1 to thereby realize up load of attribute data, the CPU 9 of the video game apparatus 1 may read out attribute data of the non-volatile memory 46 of the memory card device 40 to thereby realize up load of attribute data.

As explained above, such an approach is employed in both the body of the video game apparatus 1 and the memory card device 40 to share attribute data of dramatis personae, etc. and to change each other's respective attribute data, thereby making it possible to constitute a video game which can carry out cooperative operation.

Namely, in accordance with this invention, in a memory card device comprising a memory for storing data and an interface for connecting to information equipment and functioning as an auxiliary memory unit of the connected information equipment, the device comprising a program storage memory for storing a program, a control unit for controlling execution of the program, a display unit for displaying information in accordance with the program to be executed, an operation input unit for operating the program, and a power supply unit for supplying power utilized for the purpose of executing the program, thereby making it possible to provide a memory card device which can not only store data but also download a program, independently execute the downloaded program, and carry out cooperative operation while carrying out transmission/reception of its execution result between the memory card device and other information equipment.

Moreover, in accordance with this invention, there is provided a video game apparatus having a function to store game data obtained by executing a game into an auxiliary memory unit, the apparatus comprising a program providing unit for delivering an application program, a communication control unit connected to a main bus to which a central processing unit of the video game apparatus body is connected, and a slot connected to the main bus through the communication control unit and adapted so that the auxiliary memory unit is detachably connected to the video game apparatus, wherein, since the central processing unit has a control function to download an application program from the program providing unit into the auxiliary memory unit through the communication control unit, the auxiliary memory unit is caused to independently execute the application program to have the ability to carry out cooperative operation to take therein its execution result to constitute a game, etc.

Further, in accordance with this invention, there can be provided video game apparatus having a function to store game data obtained by executing a game into an auxiliary memory unit, the apparatus comprising a program providing unit for delivering an application program, a communication control unit connected to a main bus to which a central processing unit of the video game apparatus body is connected, and a common slot connected to the main bus through the communication control unit and adapted so that the auxiliary memory unit and a memory card device are detachably connected to the video game apparatus, wherein the auxiliary memory unit has a non-volatile memory for storing game data obtained by executing the game by the video game apparatus body, and since the memory card device includes a program memory for storing a downloaded application program, and a control unit for executing the downloaded application program independently of the video game, storage of data to the auxiliary memory unit and download of a program with respect to the memory card device can be carried out through the common slot.

Further, in accordance with this invention, there can be provided a memory card device having an interface which can be connected to information equipment, the apparatus including a program storage memory for storing a program, a control unit for controlling execution of the program, a display unit for displaying information in accordance with the program to be executed, an operation input unit for operating the program, and a power supply unit for supplying power utilized for executing the program, wherein the program is downloaded into the program memory through the interface from information equipment connected thereto, and since the program downloaded into the auxiliary memory unit and the program executed at the information equipment body are application programs different from each other, one program can be downloaded, and the other program can be executed independently of the downloaded program and cooperative operation can be carried out while carrying out transmission/reception of its execution result between the memory card device and other information equipment.

Further, in accordance with this invention, there can be provided a memory card device having a function such that attribute data utilized at the control unit under a program is downloaded into the program memory through an interface from connected information equipment to vary attribute data in accordance with input from the operation input unit, thereby making it possible to not only simply store data, but also independently execute an application.

Further, in accordance with this invention, changed attribute data is up-loaded into information equipment, thereby making it possible to carry out cooperative operation while carrying out transmission/reception of an execution result between the device and other information equipment.

Further, in accordance with this invention, there can be provided a memory card device in which, since a program downloaded into the auxiliary memory unit and a program executed at information equipment are caused to be application programs different from each other, each application program can be independently executed.

In addition, in accordance with this invention, in providing a medium for providing an application program with respect to a video game unit, at least two different application programs are recorded with respect to the providing medium, wherein one of the at least two different application programs is an application program executed at the video game apparatus and the other one is an application program executed at the memory card device connected to the video game apparatus, whereby each program can also be downloaded, and the downloaded program can be independently executed and cooperative operation can be carried out while carrying out transmission/reception of its execution result between the device and other information equipment.

What is claimed is:

1. A video game apparatus operable to execute application programs to provide video games, comprising:
   a base unit including:
      a program providing unit operable to provide a first application program; and
      a central processing unit operable to execute a second application program to provide a second video game; and
   an auxiliary memory unit operable to communicate with said base unit, said auxiliary memory unit including a program memory operable to store the first application program, a control unit operable to execute the first application program independently of the base unit, and an operation input unit operable to receive input to change attributes for executing the second application program,
   wherein said base unit is operable to download to said auxiliary memory unit the first application program and data representing attributes for providing a first video game upon execution of the first application program, and to receive from said auxiliary memory unit data representing changes in attributes for providing the second video game, and
   wherein said central processing unit is operable to execute the second application program to provide the second video game according to the changes in attributes received by said base unit from said auxiliary memory unit.

2. The video game apparatus of claim 1, wherein said base unit further includes a communication control unit by which said base unit downloads the first application program to said auxiliary memory unit and receives from said auxiliary memory unit the data representing changes in attributes.

3. The video game apparatus of claim 1 wherein said base unit further includes a slot including a plurality of conductors adapted to removably contact conductors of said auxiliary memory unit, said conductors of said slot permitting communication between said base unit and said auxiliary memory unit.

4. The video game apparatus of claim 1, wherein said base unit further includes wireless communication means operable to permit at least the data representing attributes for providing the first video game and the data representing changes in attributes for providing the second video game to be wirelessly communicated between said base unit and said auxiliary memory unit.

5. The video game apparatus of claim 1, wherein said program memory of said auxiliary memory unit includes non-volatile memory.

6. The video game apparatus of claim 1, wherein the data representing attributes for providing the first video game and the data representing changes in attributes for providing the second video game include at least one of dramatis personae, and degree of growth of the dramatis personae.

7. A base unit operable to execute an application program to provide a video game, comprising:
   a program providing unit operable to provide a first application program; and
   a central processing unit operable to execute a second application program to provide a second video game;
   wherein said base unit is operable to download the first application program and data representing attributes for providing the first video game to an auxiliary memory unit connectable to said base unit, and to receive from the auxiliary memory unit data representing changes in attributes for executing the second application program to provide the second video game, and
   wherein said central processing unit is operable to execute the second application program to provide the second video game according to the data representing the changes in attributes received from the auxiliary memory unit.

8. The base unit of claim 7, further including a communication control unit by which said base unit downloads the first application program to the auxiliary memory unit when connected thereto and receives from the auxiliary memory unit the data representing changes in attributes.

9. The base unit of claim 7, further including a slot including a plurality of conductors adapted to removably contact conductors of the auxiliary memory unit to permit communication between said base unit and the auxiliary memory unit when connected thereto.

10. The base unit of claim 7, further including wireless communication means operable to permit at least the data representing attributes for providing the first video game and the data representing changes in attributes for providing the second video game to be wirelessly communicated between said base unit and the auxiliary memory unit.

11. The base unit of claim 7, wherein the data representing attributes for providing the first video game and the data representing changes in attributes for providing the second video game include at least one of dramatis personae, and degree of growth of the dramatis personae.

12. A method of transferring information between an auxiliary memory unit and a base unit to which the auxiliary memory unit is removably connectable, the auxiliary memory unit including a processor and being operable to execute a first application program to provide a first video game, the base unit being operable to execute a second application program to provide a second video game, said method comprising:

loading the first application program for providing the first video game from the base unit into the auxiliary memory unit;

loading data representing attributes for executing the first application program from the base unit into the auxiliary memory unit;

receiving at the base unit from the auxiliary memory unit data representing changes in attributes for executing the second application program to provide the second video game; and executing the second application program in the base unit to provide the second video game using the data representing changes in attributes received from the auxiliary memory unit.

13. The method of claim 12, wherein the data loaded into the auxiliary memory unit and the data received by the base unit from the auxiliary memory unit include data representing attributes for providing at least one of dramatis personae and degree of growth of the dramatis personae.

14. A machine-readable medium recorded with machine-readable code including instructions for performing a method of transferring information between an auxiliary memory unit and a base unit to which the auxiliary memory unit is removably connectable, the auxiliary memory unit including a processor and being operable to execute a first application program to provide a first video game, the base unit being operable to execute a second application program to provide a second video game, said method comprising:

loading the first application program for providing the first video game from the base unit into the auxiliary memory unit;

loading data representing attributes for executing the first application program from the base unit into the auxiliary memory unit;

receiving at the base unit from the auxiliary memory unit data representing changes in attributes for executing the second application program; and executing the second application program in the base unit to provide the second video game using the data representing changes in attributes received from the auxiliary memory unit.

15. The machine-readable medium of claim 14, wherein the data loaded into the auxiliary memory unit and the data received by the base unit from the auxiliary memory unit include data representing attributes for providing at least one of dramatis personae and degree of growth of the dramatis personae.

* * * * *